US012577450B2

(12) United States Patent
Vidma et al.

(10) Patent No.: US 12,577,450 B2
(45) Date of Patent: Mar. 17, 2026

(54) COMPOSITIONS FOR SINGLE-STAGE TREATMENT OF SILICEOUS SUBTERRANEAN FORMATIONS

(71) Applicant: Schlumberger Technology Corporation, Sugar Land, TX (US)

(72) Inventors: Konstantin Viktorovich Vidma, Sugar Land, TX (US); Murtaza Ziauddin, Sugar Land, TX (US); Daniel Gettemy, Sugar Land, TX (US); Christopher S. Daeffler, Sugar Land, TX (US); Temiloluwa Iyenoma Yusuf, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/505,445

(22) Filed: Nov. 9, 2023

(65) Prior Publication Data

US 2024/0101891 A1     Mar. 28, 2024

Related U.S. Application Data

(63) Continuation-in-part of application No. 18/552,296, filed as application No. PCT/US2022/021630 on Mar. 24, 2022, now Pat. No. 12,270,288.

(60) Provisional application No. 63/166,072, filed on Mar. 25, 2021.

(51) Int. Cl.
| | | |
|---|---|---|
| *E21B 43/27* | (2006.01) | |
| *C09K 8/528* | (2006.01) | |
| *E21B 37/06* | (2006.01) | |

(52) U.S. Cl.
CPC .............. *C09K 8/528* (2013.01); *E21B 37/06* (2013.01); *E21B 43/27* (2020.05)

(58) Field of Classification Search
CPC ..................................................... C09K 8/528
See application file for complete search history.

(56) References Cited

U.S. PATENT DOCUMENTS

| | | | |
|---|---|---|---|
| 4,330,419 | A | 5/1982 | Hall |
| 4,848,467 | A | 7/1989 | Cantu |
| 4,957,165 | A | 9/1990 | Cantu |
| 4,986,355 | A | 1/1991 | Casad |
| 5,096,618 | A | 3/1992 | Frenier |
| 5,529,125 | A | 6/1996 | Di Lullo Arias |
| 5,979,557 | A | 11/1999 | Card |
| 5,993,558 | A | 11/1999 | Webster, Jr |
| 6,435,277 | B1 | 8/2002 | Qu |
| 6,703,352 | B2 | 3/2004 | Dahayanake |
| 6,949,491 | B2 | 9/2005 | Cooke, Jr. |
| 7,036,587 | B2 | 5/2006 | Munoz, Jr. |
| 7,059,414 | B2 | 6/2006 | Rae |
| 7,115,546 | B2 | 10/2006 | Qu |

| | | | |
|---|---|---|---|
| 7,119,050 | B2 | 10/2006 | Chang |
| 7,144,844 | B2 | 12/2006 | Qu |
| 7,182,136 | B2 | 2/2007 | Dalrymple |
| 7,192,908 | B2 | 3/2007 | Frenier |
| 7,219,731 | B2 | 5/2007 | Sullivan |
| 7,220,709 | B1 | 5/2007 | Qu |
| 7,237,608 | B2 | 7/2007 | Fu |
| 7,265,079 | B2 | 9/2007 | Willberg |
| 7,267,170 | B2 | 9/2007 | Mang |
| 7,299,870 | B2 | 11/2007 | Garcia-Lopez de Victoria |
| 7,350,572 | B2 | 4/2008 | Fredd |
| 7,380,600 | B2 | 6/2008 | Willberg |
| 7,380,602 | B2 | 6/2008 | Brady |
| 7,482,311 | B2 | 1/2009 | Willberg |
| 7,506,689 | B2 | 3/2009 | Surjaatmadja |
| 7,510,009 | B2 | 3/2009 | Cawiezel |
| 7,550,413 | B2 | 6/2009 | Huang |
| 7,565,929 | B2 | 7/2009 | Bustos |
| 7,575,054 | B2 | 8/2009 | Fuller |
| 7,582,311 | B1 | 9/2009 | Cleland |
| 7,666,821 | B2 | 2/2010 | Fu |
| 7,775,278 | B2 | 8/2010 | Willberg |
| 7,934,556 | B2 | 5/2011 | Clark |
| 8,016,034 | B2 | 9/2011 | Glasbergen |
| 8,109,335 | B2 | 2/2012 | Luo |
| 8,167,043 | B2 | 5/2012 | Willberg |
| 8,220,543 | B2 | 7/2012 | Clark |
| 8,312,929 | B2 | 11/2012 | Frenier |
| 8,316,941 | B2 | 11/2012 | Frenier |
| 8,618,026 | B2 | 12/2013 | Ezell |
| 8,646,529 | B2 | 2/2014 | Clark |
| 8,714,249 | B1 | 5/2014 | Tang |
| 8,720,556 | B2 | 5/2014 | Todd |

(Continued)

FOREIGN PATENT DOCUMENTS

| | | |
|---|---|---|
| CA | 2530325 C | 3/2009 |
| WO | 2015012753 A1 | 1/2015 |

(Continued)

OTHER PUBLICATIONS

Search Report and Written Opinion issued in the PCT Application No. PCT/US2024/055025 dated Feb. 21, 2025, 11 pages.
Search Report and Written Opinion of International Patent Application No. PCT/US2022/021630 dated Juy 1, 2022, 10 pages.
Office Action issued in U.S. Appl. No. 18/552,296 dated Jun. 10, 2024, 18 pages.
Search Report and Written Opinion of International Patent Application No. PCT/US2023/029075 dated Nov. 15, 2023, 9 pages.

(Continued)

*Primary Examiner* — Silvana C Runyan

(74) *Attorney, Agent, or Firm* — Jeffrey D. Frantz

(57) ABSTRACT

An aqueous composition includes an acid, or an ammonium or salt thereof; a hydrogen fluoride (HF) source; and a fluoride scale inhibitor. Various methods include providing the aqueous composition and performing a treatment operation using the aqueous composition.

16 Claims, 4 Drawing Sheets

(56) References Cited

U.S. PATENT DOCUMENTS

| | | | |
|---|---|---|---|
| 8,726,991 B2 | 5/2014 | Boney | |
| 8,887,803 B2 | 11/2014 | East, Jr. | |
| 8,905,133 B2 | 12/2014 | Potapenko | |
| 8,936,086 B2 | 1/2015 | Liang | |
| 8,973,659 B2 | 3/2015 | Karadkar | |
| 9,022,112 B2 | 5/2015 | Chaabouni | |
| 9,034,806 B2 | 5/2015 | Gurmen | |
| 9,135,475 B2 | 9/2015 | Lecerf | |
| 9,322,260 B2 | 4/2016 | Potapenko | |
| 9,376,888 B2 | 6/2016 | Tang | |
| 9,556,720 B2 | 1/2017 | Onda | |
| 9,580,642 B2 | 2/2017 | Brannon | |
| 9,593,565 B2 | 3/2017 | Lecerf | |
| 9,657,557 B2 | 5/2017 | Bugrin | |
| 9,663,706 B2 | 5/2017 | Fu | |
| 9,670,399 B2 | 6/2017 | Reyes | |
| 9,919,966 B2 | 3/2018 | Gupta | |
| 9,920,610 B2 | 3/2018 | Nelson | |
| 9,938,811 B2 | 4/2018 | Bestaoui-Spurr | |
| 10,030,471 B2 | 7/2018 | Lecerf | |
| 10,041,327 B2 | 8/2018 | Nelson | |
| 10,280,362 B2 | 5/2019 | Purdy | |
| 10,301,903 B2 | 5/2019 | Payne | |
| 10,329,476 B2 | 6/2019 | Purdy | |
| 10,590,336 B2 | 3/2020 | Purdy | |
| 10,738,237 B2 | 8/2020 | Beuterbaugh | |
| 10,753,001 B2 | 8/2020 | Purdy | |
| 10,822,535 B2 | 11/2020 | Purdy | |
| 10,947,123 B2 | 3/2021 | Purdy | |
| 10,982,133 B2 | 4/2021 | Purdy | |
| 11,098,241 B2 | 8/2021 | Purdy | |
| 11,168,246 B2 | 11/2021 | Purdy | |
| 11,370,961 B2 | 6/2022 | Purdy | |
| 11,447,692 B2 | 9/2022 | Purdy | |
| 11,708,526 B2 | 7/2023 | Al-Harbi | |
| 2003/0134751 A1 | 7/2003 | Lee | |
| 2004/0177960 A1* | 9/2004 | Chan | C09K 8/72 166/308.1 |
| 2004/0254079 A1* | 12/2004 | Frenier | C09K 8/52 507/260 |
| 2005/0016731 A1 | 1/2005 | Rae | |
| 2006/0102349 A1* | 5/2006 | Brady | C09K 8/52 507/923 |
| 2007/0235189 A1* | 10/2007 | Milne | C09K 8/74 507/923 |
| 2008/0139412 A1 | 6/2008 | Fuller | |
| 2008/0146465 A1 | 6/2008 | Fu | |
| 2009/0042748 A1 | 2/2009 | Fuller | |
| 2009/0075844 A1* | 3/2009 | Ke | C09K 8/78 507/237 |
| 2009/0192057 A1* | 7/2009 | Frenier | C09K 8/74 507/240 |
| 2009/0233819 A1 | 9/2009 | Fuller | |
| 2010/0230106 A1* | 9/2010 | Milne | C09K 8/882 507/224 |
| 2013/0079260 A1 | 3/2013 | Frenier | |
| 2013/0228336 A1 | 9/2013 | Droger | |
| 2013/0233558 A1 | 9/2013 | Fu | |
| 2015/0083417 A1 | 3/2015 | Lant | |
| 2016/0264849 A1 | 9/2016 | Oliveira | |
| 2016/0272879 A1 | 9/2016 | Reddy | |
| 2018/0347332 A1 | 12/2018 | Bestaoui-Spurr | |
| 2019/0345807 A1 | 11/2019 | Purdy | |
| 2020/0165511 A1 | 5/2020 | Nino-Penaloza | |
| 2020/0263080 A1 | 8/2020 | Purdy | |
| 2020/0317516 A1 | 10/2020 | Purdy | |
| 2020/0318009 A1 | 10/2020 | Purdy | |
| 2021/0189226 A1 | 6/2021 | Purdy | |
| 2021/0189855 A1 | 6/2021 | Purdy | |
| 2021/0198561 A1 | 7/2021 | Purdy | |
| 2021/0230476 A1 | 7/2021 | Purdy | |
| 2021/0388265 A1 | 12/2021 | Purdy | |
| 2022/0049156 A1 | 2/2022 | Purdy | |
| 2022/0089938 A1 | 3/2022 | Purdy | |
| 2022/0267178 A1 | 8/2022 | Purdy | |

FOREIGN PATENT DOCUMENTS

| | | |
|---|---|---|
| WO | 2022204339 A1 | 9/2022 |
| WO | 2024026137 A1 | 2/2024 |

OTHER PUBLICATIONS

Nelson, P. H., "Pore-throat sizes in sandstones, tight sandstones, and shales", AAPG Bulletin, 2009, 93(3), pp. 329-340.

Gidley, J. L., "Acidizing Sandstone Formations: A Detailed Examination of Recent Experience", SPE 14164, presented at the 60th Annual Technical Conference and Exhibition of the Society of Petroleum Engineers, held in Las Vegas, NV, 1985, 11 pages.

McLeod et al., "Sandstone Acidizing", Reservoir Stimulation Book, Section 18-8, pp. 1-28.

Kashif, M. et al., "Pore Size Distribution, Their Geometry and connectivity in deeply buried Paleogene Es1 sandstone reservoir, Nanpu Sag, East China", Petroleum Science, 2019, 16, pp. 981-1000.

* cited by examiner 0 min
Reference
Fluid D          Fluid D
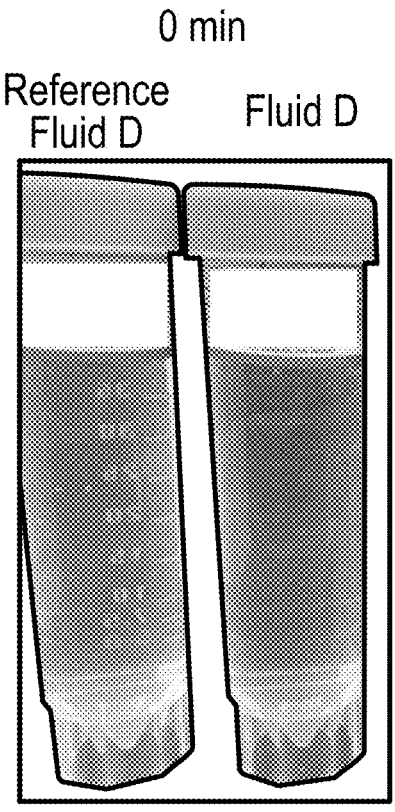
1,300 min
Reference
Fluid D          Fluid D
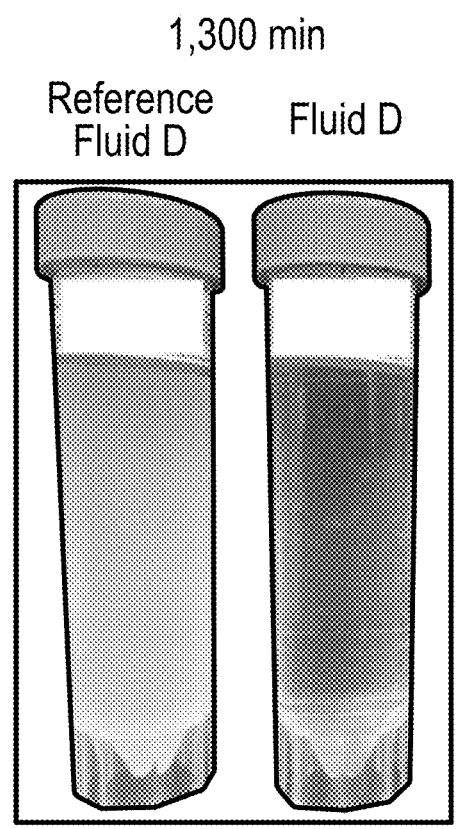
FIG. 4

COMPOSITIONS FOR SINGLE-STAGE TREATMENT OF SILICEOUS SUBTERRANEAN FORMATIONS

CROSS-REFERENCE TO RELATED APPLICATIONS

This application is a continuation-in-part of U.S. patent application Ser. No. 18/552,296, entitled "Method for Single-Stage Treatment of Siliceous Subterranean Formations", filed Sep. 25, 2023, now U.S. Pat. No. 12,270,288, which is a National Stage Entry of International Patent Application No. PCT/US2022/021630, entitled "Method for Single-Stage Treatment of Siliceous Subterranean Formations", filed Mar. 24, 2022, which claims priority to United States Provisional Patent Application No. 63/166,072 filed Mar. 25, 2021, which are all entirely incorporated herein by reference.

FIELD

This disclosure relates to stimulation of hydrocarbon-containing subterranean formations. Specifically, methods of single-stage acid treatment of such formations are described herein.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Wells are generally drilled into subsurface rocks to access fluids, such as hydrocarbons, stored in subterranean formations. The subterranean fluids can be produced from these wells through known techniques. Acidic fluids are commonly injected into such formations to stimulate the formation and improve extraction of hydrocarbons from the formation. The acid dissolves, or otherwise removes, some mineral structures in the formation to improve hydrocarbon flow. In the particular case of sandstones, which contain siliceous minerals, hydrogen fluoride (HF) is used in many forms to dissolve the silica materials.

Calcium poses problems for these methods. In the case of HF treatment, calcium can precipitate as calcium fluoride, among other things. Operators therefore need methods of preventing calcium deposits from precipitating during acid treatment of formations. One such method is to treat the formation with a calcium-removing fluid prior to the acid treatment. The calcium-removing fluid dissolves calcium compounds in the formation, and when the fluid is removed, the calcium is removed or greatly reduced such that contact with acid results in, at most, only slight precipitation of calcium that does not hamper fluid conductivity.

Such methods suffer from the primary problem that the pre-treatment is not always precisely co-extensive with the acid treatment. Because the acid dissolves minerals, the acid can reach parts of the formation that were not exposed to calcium-removing fluid, resulting in calcium precipitation. Additionally, multiple stages of treatment use large volumes of treatment fluids. Methods are needed to prevent calcium precipitation during acid-treatment of hydrocarbon-containing siliceous formations. Also, reducing stages of treatment would reduce volume of treatment materials.

SUMMARY

A summary of certain embodiments described herein is set forth below. It should be understood that these aspects are presented merely to provide the reader with a brief summary of these certain embodiments and that these aspects are not intended to limit the scope of this disclosure.

In one embodiment, an aqueous composition includes an acid, or an ammonium or salt thereof; a hydrogen fluoride (HF) source; and a fluoride scale inhibitor.

In another embodiment, a method includes providing an aqueous treatment composition that includes an acid, or an ammonium or salt thereof; a hydrogen fluoride (HF) source; and a fluoride scale inhibitor. The method also includes performing a treatment operation using the aqueous treatment composition.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Certain embodiments of the disclosure will hereafter be described with reference to the drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

FIG. 4 is a series of photos of a reference fluid and a fluid according to certain embodiments of the disclosure, respectively, at various time periods after adding a solution of calcium chloride.

DETAILED DESCRIPTION

Figure 1:
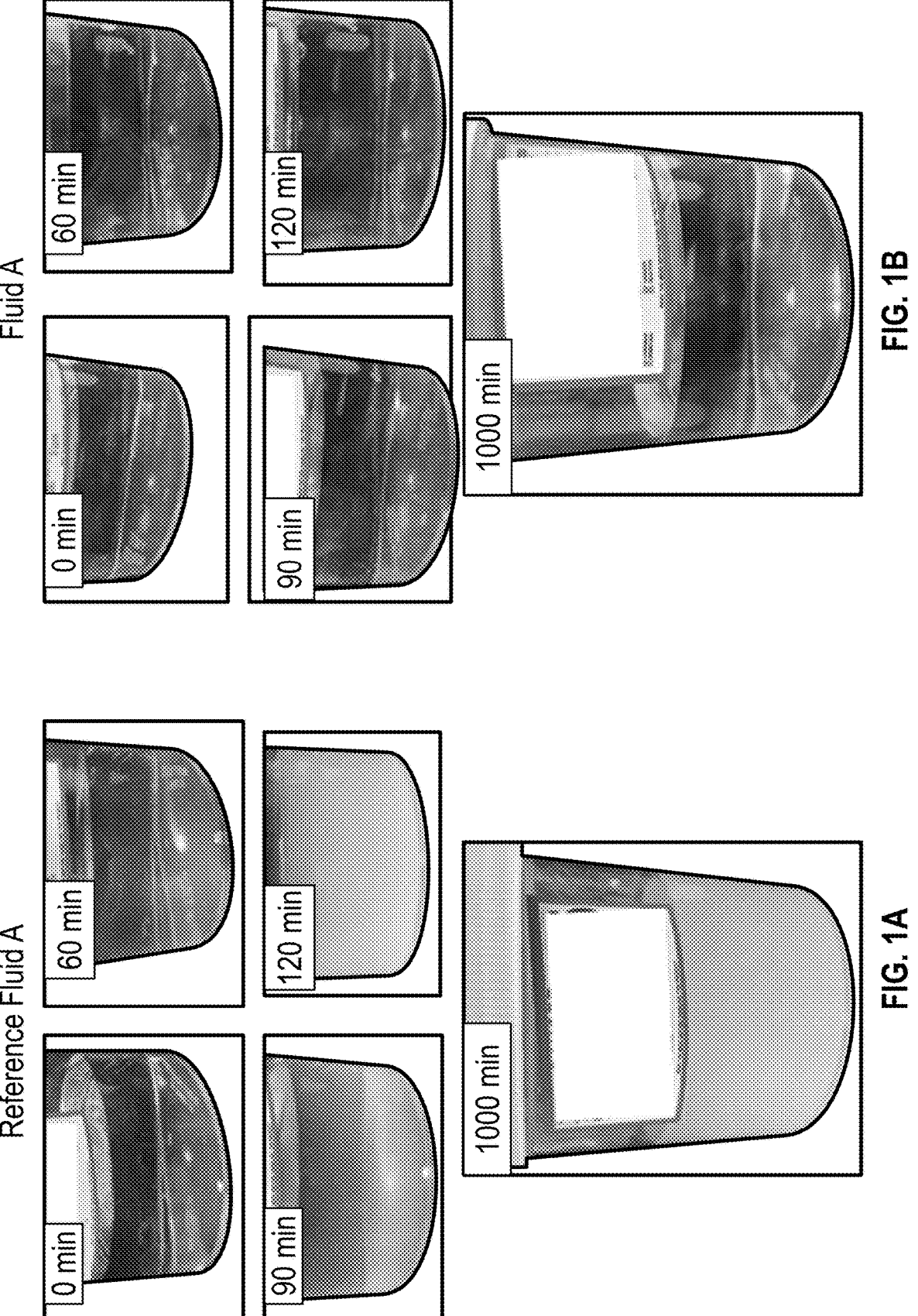
FIG. 1A is a series of photos of a reference fluid at various time periods after adding a solution of calcium chloride.
FIG. 1B is a series of photos of a fluid according to certain embodiments of the disclosure at various time periods after adding a solution of calcium chloride.

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

Methods of treating a hydrocarbon formation to enhance recovery of hydrocarbons from the formation are described herein. The methods herein comprise forming or providing an aqueous treatment composition (e.g., an acid solution) that includes a fluoride scale inhibitor. After forming or providing the aqueous treatment composition, the method may include treating the formation with the aqueous treatment composition. The fluoride scale inhibitor interrupts crystallization of fluoride deposits resulting from reaction of the aqueous treatment solution with formation materials. The aqueous treatment composition also includes an acid, or an ammonium or a salt thereof, and a hydrogen fluoride (HF) source. In certain embodiments, the acid, or the ammonium or the salt thereof, may be the same as the HF source.

The aqueous treatment composition includes a HF source, such as hydrogen fluoride, hydrofluoric acid, and/or any other suitable HF source, to dissolve and/or remove clay and other siliceous materials that can reduce fluid flow within the formation. In certain embodiments, the aqueous treatment composition may include other acids, such as hydrochloric acid, or other mineral acids and organic acids, to bring the acidity of the solution to a target range or into a target range. In particular, the aqueous treatment compositions described herein have a pH of, or adjusted to, about −0.8 to about 7.0, such as about −0.8 to about 1.0, about 1 to about 3, or about 3 to about 7, or the like. The treatment methods and compositions described herein can be used beneficially without the need for an acid preflush in most cases.

The scale inhibitors used herein are a phosphonic acid, a phosphoric acid, a phosphonate, a phosphate, a polyacrylamide, a phosphonated polyetheramine, a salt of an acrylamido-methyl propane sulfonate/acrylic acid copolymer (AMPS/AA), phosphinated maleic copolymer (PHOS/MA), a salt of a polymaleic acid/acrylic acid/acrylamido-methyl propane sulfonate terpolymer (PMA/AMPS), organophosphonates and derivatives thereof, including hydroxyethylidene diphosphonic acid (HEDP) or salts thereof, 2-phosphonobutane-1,2,4-tricarboxylic acid (PBTC) or salts thereof, amino trimethylene phosphonic acid (ATMP) or salts thereof, diethylene triamine penta (methylene phosphonic acid) (DTPMPA) or salts thereof, 2-hydroxy phosphonoacetic acid (HPAA) or salts thereof, polyamino polyether methylene phosphonic acid (PAPEMP), bis(hexamethylene triamine penta (methylene phosphonic acid)) (BHMTPMP) or salts thereof, hydroxyethylamino-di(methylene phosphonic acid) (HEMPA) or salts thereof, ethylene diamine tetra (methylene phosphonic acid) (EDTMPA) or salts thereof, hexamethylenediaminetetra (methylenephosphonic acid) (HMDTMPA) or salts thereof, a phosphate ester, or a mixture of any of the listed materials. Salts can be ammonium salts, sodium salts, lithium salts, or mixtures thereof.

The scale inhibitors herein inhibit the formation of metal ion-containing precipitation, such as calcium, aluminum, magnesium, ferric, etc., particularly fluoride precipitates. In sandstone acid treatment, calcium fluoride is the major precipitation causing damage when calcium-containing materials exist in the formation. The scale inhibitors herein prevent the formation of calcium fluoride precipitate and then eliminate the potential damage to the formation. The efficacy of the scale inhibitors depends on amount of scale inhibitor used and formation conditions (temperature, composition). The scale inhibitor is used at a concentration of 0.1% to 5% by weight in the treatment fluid. These scale inhibitors work to limit precipitation in the pH range of a pH of about −0.8 to about 7.0, such as about −0.8 to about 1.0, about 1 to about 3, or about 3 to about 7, or the like. Outside that pH range, the precipitation limiting function of the scale inhibitors is diminished.

As mentioned above, the aqueous treatment composition typically contains HF, or a source thereof, such as ammonium bifluoride, and may contain one or more other acids to bring the pH of the aqueous treatment solution to a target or within a target range. The acids used herein are typically simple acids, and/or salts thereof. The acids can be organic and/or inorganic, and the organic acids can be substituted with halogen atoms such as fluorine, chlorine, bromine, and iodine. Examples include hydrochloric acid (HCl), formic acid, acetic acid, chloroacetic acid, citric acid, phosphoric acid, perchloric acid, nitric acid, hydroiodic acid, iodic acid, uric acid, sulfonic acid, lactic acid, glycolic acid, glyceric acid, sulfamic acid, methylsulfamic acid, tartaric acid, succinic acid, fumaric acid, butyric acid, valeric acid, isovaleric acid, oxalic acid, malic acid, and maleic acid. Substituted versions, for example isomers or versions of the above acids having heteroatoms such as sulfur, nitrogen, phosphorus, silicon, and the like, for example amino acids or acid amides, or other acid derivatives of any of the listed acids can also be used. Ammonium, sodium, or lithium salts thereof can also be included.

The treatment composition herein can include other ingredients, such as Brønsted acids, corrosion inhibitors, mutual solvents, clay control agents, wetting agents, iron control agents, chelating agents, and fluid loss additives. Diversion control materials, such as ball sealers and particulate materials, can also be added to the treatment fluid. Particulate materials that can be included in the treatment fluid include polymers and copolymers of lactide, glycolide, amide, phosphate, and mixtures thereof, polyethyleneterephthalate (PET); polybutyleneterephthalate (PBT); polyethylenenaphthalenate (PEN); partially hydrolyzed polyvinyl acetate; polyacrylamide, polymethacrylanlide and derivatives, combinations, or mixtures thereof, any of which may be degradable or soluble. Chelants that can be used include maleic acid, tartaric acid, citric acid, nitrilotriacetic acid, hydroxyethyliminodiacetic acid, hydroxyethylethylenediaminetetraacetic acid, ethylenediaminetetraacetic acid, cyclohexylenediaminetetraacetic acid, diethylenetriaminepentaacetic acid, ammonium salts thereof, lithium salts thereof, sodium salts thereof, and mixtures thereof.

Other additives that can be used include fluoride binding agents, such as boric acid and aluminum chloride, inhibitors for precipitation of fluorosilicate and fluoroaluminate salts, and surfactants, which may be viscoelastic surfactants and/or other surfactants. Other additives that can be used include permanent clay stabilizers, non-emulsifiers, corrosion inhibitors, friction reducers, iron control agents, diverting agents, or fluid-loss control agents. These additives can be used alone or in any combination in the aqueous treatment compositions described herein.

Although certain embodiments are described herein with reference to forming or providing the aqueous treatment composition and/or treating a formation with the aqueous treatment composition. It should be understood that such embodiments are exemplary, and that the aqueous treatment composition described herein may be used in any suitable operation. For example, such operations may include treating a siliceous geologic formation, a wellbore cleaning operation, a pickling operation, a spearhead treatment operation, a tube cleaning operation, or a gravel pack cleaning operation, or a combination thereof.

In accordance with certain embodiments of the present disclosure, an aqueous composition includes an acid, or an ammonium or salt thereof; a hydrogen fluoride (HF) source; and a fluoride scale inhibitor.

In certain embodiments, the acid has a molecular weight less than 400 Daltons. In certain embodiments, the aqueous composition has a pH from about −0.8 to about 7. In certain embodiments, the aqueous composition has a pH from about −0.8 to about 1.0. In certain embodiments, the aqueous composition has a pH from about 1.0 to about 3.0. In certain embodiments, the aqueous composition has a pH from about 3.0 to about 7.0.

In certain embodiments, a concentration of the fluoride scale inhibitor is from about 0.1 wt % to about 5.0 wt %. In certain embodiments, the fluoride scale inhibitor comprises a phosphonic acid, a phosphoric acid, a phosphonate, a phosphate, a polyacrylamide, a phosphonated polyether-amine, a salt of an acrylamido-methyl propane sulfonate/acrylic acid copolymer, phosphinated maleic copolymer, a salt of a polymaleic acid/acrylic acid/acrylamido-methyl propane sulfonate terpolymer, or a mixture thereof. In certain embodiments, the fluoride scale inhibitor comprises hydroxyethylidene diphosphonic acid (HEDP) or a salt thereof, 2-phosphonobutane-1,2,4-tricarboxylic acid (PBTC) or a salt thereof, amino trimethylene phosphonic acid (ATMP) or a salt thereof, diethylene triamine penta (methylene phosphonic acid) (DTPMPA) or a salt thereof, 2-hydroxy phosphonoacetic acid (HPAA) or a salt thereof, polyamino polyether methylene phosphonic acid (PA-PEMP), bis(hexamethylene triamine penta (methylene phosphonic acid)) (BHMTPMP) or a salt thereof, hydroxyethyl-amino-di(methylene phosphonic acid) (HEMPA) or a salt thereof, ethylene diamine tetra (methylene phosphonic acid) (EDTMPA) or a salt thereof, and hexamethylenediaminetetra (methylenephosphonic acid) (HMDTMPA) or a salt thereof.

In certain embodiments, the aqueous composition further includes a chelant, a fluoride binding agent, a fluorosilicate precipitation inhibitor, a fluoroaluminate precipitation inhibitor, a particulate material, a viscoelastic surfactant, a permanent clay stabilizer, a non-emulsifier, a corrosion inhibitor, a friction reducer, an iron control agent, a diverting agent, or a fluid-loss control agent, or a combination thereof. In certain embodiments, the aqueous composition further includes the permanent clay stabilizer, and the permanent clay stabilizer includes a blend of sodium formate and cationic polymer, poly-quaternary amines, boric acid, or a combination thereof. In certain embodiments, the aqueous composition further includes one or more self-diverting additives including foam, particulate material, a viscoelastic surfactant-based diverter, or a combination thereof.

In certain embodiments, the acid is an organic acid in a mixture of organic acids. In certain embodiments, the acid is citric acid and the mixture of organic acids includes a mixture of citric and lactic acid. In certain embodiments, the acid is an organic acid in a mixture of organic and mineral acids. In certain embodiments, the acid is a mineral acid.

In accordance with certain embodiments of the present disclosure, a method includes providing an aqueous treatment composition that includes an acid, or an ammonium or salt thereof; a hydrogen fluoride (HF) source; and a fluoride scale inhibitor.

In certain embodiments, the treatment operation includes treating a siliceous geologic formation, a wellbore cleaning operation, a pickling operation, a spearhead treatment operation, a tube cleaning operation, a gravel pack cleaning operation, or a combination thereof. In certain embodiments, performing the treatment operation is the only stage of an acid treatment operation performed on a geologic formation. In certain embodiments, the method further includes adjusting a pH of the aqueous treatment composition using a mineral acid.

EXAMPLES

The following four examples show the effectiveness of calcium fluoride ($CaF_2$) precipitation prevention in range of fluid pH with a variety of compositions, including the aqueous treatment composition described herein. $CaF_2$ precipitation in an acid was tested by adding calcium chloride ($CaCl_2$)) solution to the acid and observing the precipitation (or lack thereof) visually.

Example 1

Fluid A was prepared by mixing 9% by weight (wt %) HCl, 1.5 wt % ammonium bifluoride, and 0.5% of a fluoride scale inhibitor in water. The resulting pH of Fluid A was −0.34%. A solution of $CaCl_2$) was added to Fluid A to obtain a total concentration of $Ca^{2+}$ ions of 10 g/l. Then, precipitation of $CaF_2$ was observed visually. Reference Fluid A was prepared similarly to Fluid A but without a fluoride scale inhibitor. FIG. 1A shows a series of photos of Reference Fluid A after adding the solution of $CaCl_2$) at 0 minutes, 60 minutes, 90 minutes, 120 minutes, and 1000 minutes. FIG. 1B shows a series of photos of Fluid A after adding the solution $CaCl_2$) at 0 minutes, 60 minutes, 90 minutes, 120 minutes, and 1000 minutes. As shown in FIGS. 1A and 1B, no precipitation was observed in Fluid A up to at least 1000 minutes after the addition of $CaCl_2$) while precipitation was clearly observed in Reference Fluid A at 90 minutes after the addition of $CaCl_2$), and increased over time.

The mixing of Fluid A and Reference Fluid A and the subsequent tests of Fluid A and Reference Fluid A were performed at room temperature (e.g., 70° F.).

Example 2

Figure 2:
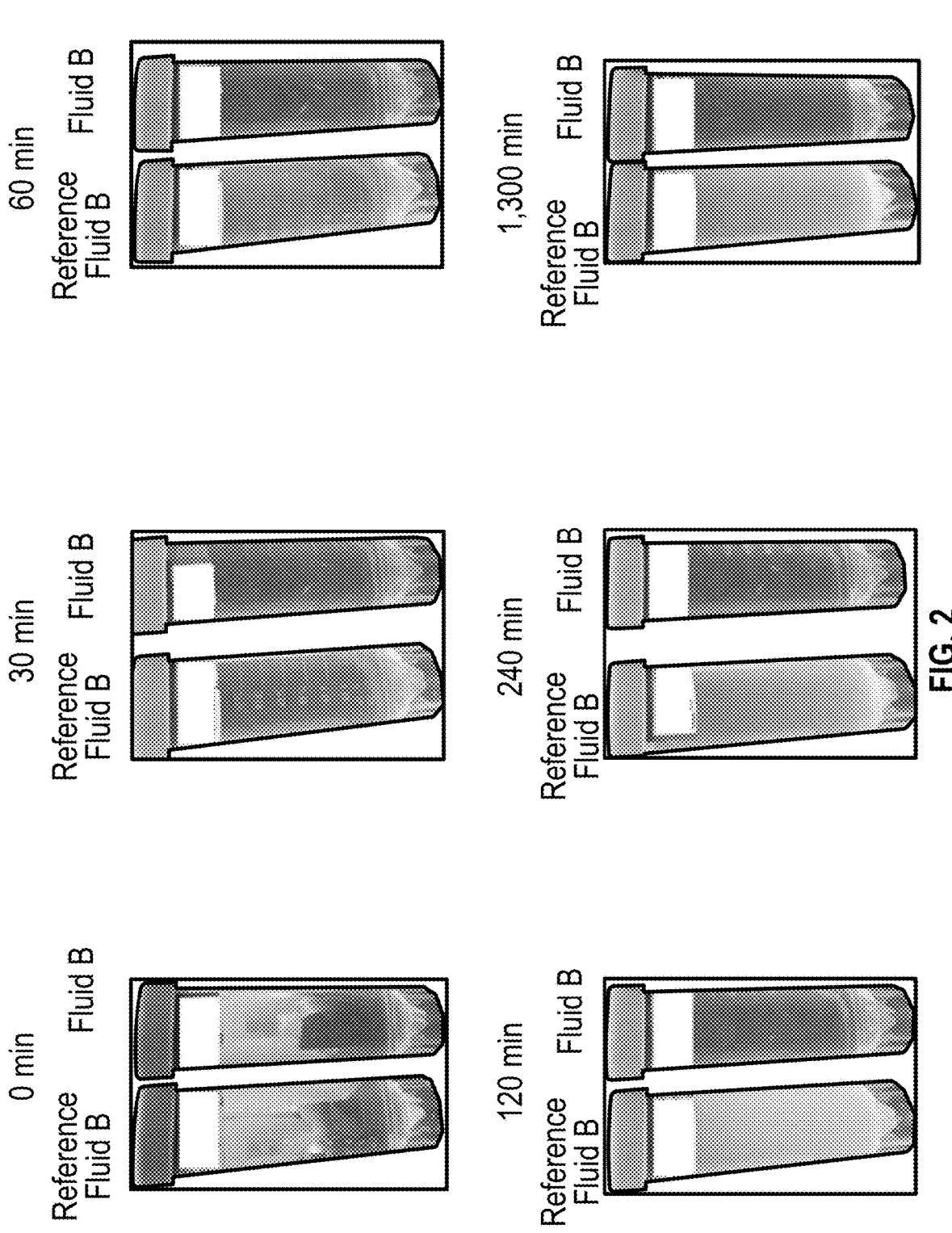
FIG. 2 is a series of photos of a reference fluid and a fluid according to certain embodiments of the disclosure, respectively, at various time periods after adding a solution of calcium chloride.

Fluid B was prepared by mixing 3.6 wt % HCl, 13.5 wt % citric acid, 5.4 wt % ammonium bifluoride, 2.7 wt % boric acid, and 0.5% of a fluoride scale inhibitor in water. The resulting pH of Fluid B was XX. A solution of $CaCl_2$) was added to Fluid B to obtain a total concentration of $Ca^{2+}$ ions of 10 g/l. Then, precipitation of $CaF_2$ was observed visually. Reference Fluid B was prepared similarly to Fluid B but without a fluoride scale inhibitor. FIG. 2 shows a series of photos of Reference Fluid B and Fluid B, respectively, after adding the solution of $CaCl_2$) at 0 minutes, 30 minutes, 60 minutes, 120 minutes, 240 minutes, and 1300 minutes. As shown in FIG. 2, no precipitation was observed in Fluid B up to at least 1300 minutes after the addition of $CaCl_2$) while precipitation was clearly observed in Reference Fluid B at 60 minutes after the addition of $CaCl_2$), and increased over time.

The mixing of Fluid B and Reference Fluid B and the subsequent tests of Fluid B and Reference Fluid B were performed at room temperature (e.g., 70° F.).

Example 3

Figure 3:
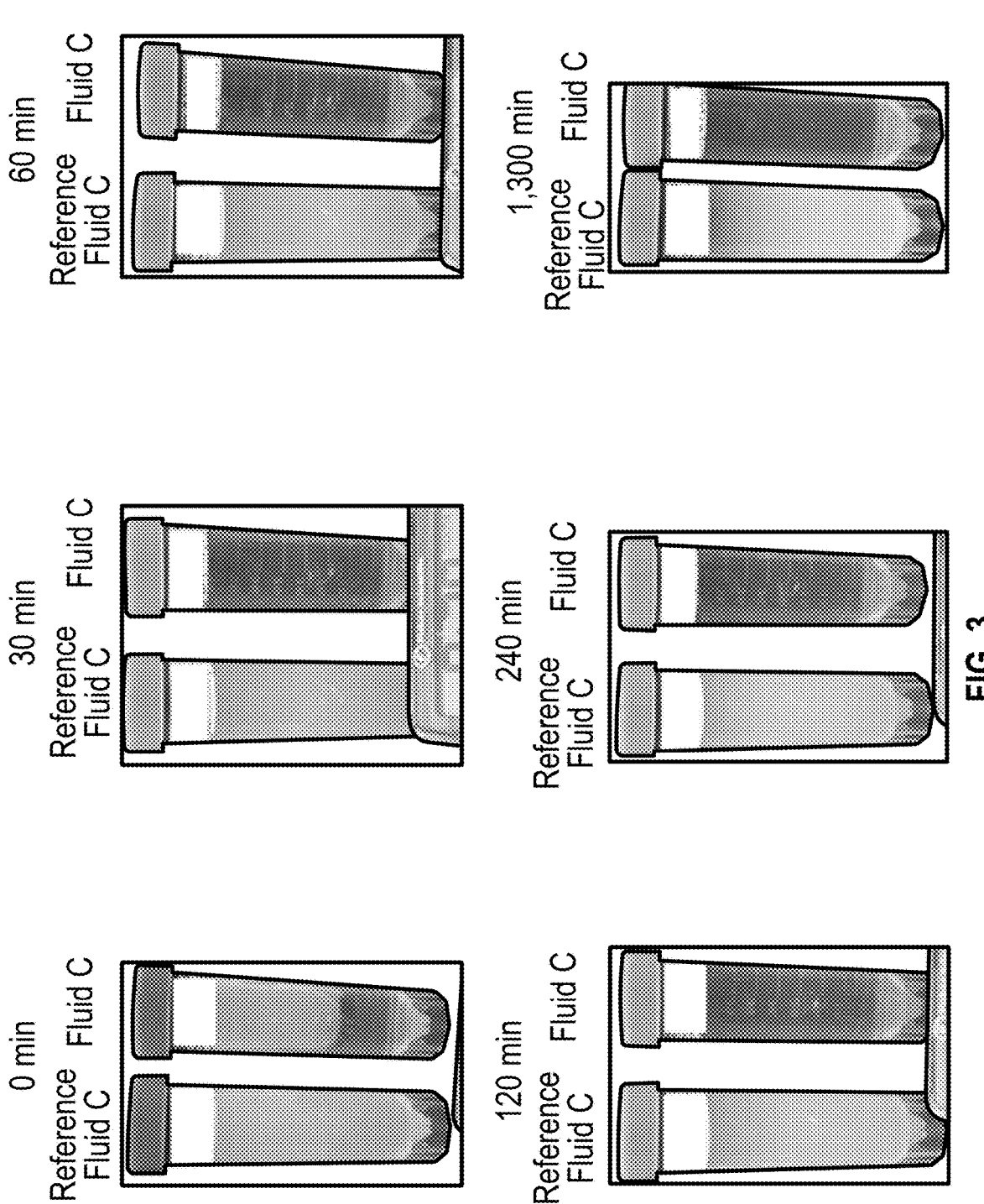
FIG. 3 is a series of photos of a reference fluid and a fluid according to certain embodiments of the disclosure, respectively, at various time periods after adding a solution of calcium chloride.

Fluid C was prepared by mixing 1.2 wt % HCl, 10.4 wt % citric acid, 2.2 wt % ammonium bifluoride, 1.25 wt % boric acid, and 0.5% of a fluoride scale inhibitor in water. The resulting pH of Fluid C was XX. A solution of $CaCl_2$)

was added to Fluid C to obtain a total concentration of $Ca^{2+}$ ions of 10 g/l. Then, precipitation of $CaF_2$ was observed visually. Reference Fluid C was prepared similarly to Fluid C but without a fluoride scale inhibitor. FIG. 3 shows a series of photos of Reference Fluid C and Fluid C, respectively, after adding the solution of $CaCl_2$) at 0 minutes, 30 minutes, 60 minutes, 120 minutes, 240 minutes, and 1300 minutes. As shown in FIG. 3, no precipitation was observed in Fluid C up to at least 1300 minutes after the addition of $CaCl_2$) while precipitation was clearly observed in Reference Fluid C immediately after the addition of $CaCl_2$), and increased over time.

The mixing of Fluid C and Reference Fluid C and the subsequent tests of Fluid C and Reference Fluid C were performed at room temperature (e.g., 70° F.).

Example 4

Fluid D was prepared by mixing 7.0 wt % HCl, 12.0 wt % ammonium bifluoride, 6.0 wt % boric acid, and 0.5% of a fluoride scale inhibitor in water. The resulting pH of Fluid D was XX. A solution of $CaCl_2$) was added to Fluid D to obtain a total concentration of $Ca^{2+}$ ions of 10 g/l. Then, precipitation of $CaF_2$ was observed visually. Reference Fluid D was prepared similarly to Fluid D but without a fluoride scale inhibitor. FIG. 4 shows a series of photos of Reference Fluid D and Fluid D, respectively, after adding the solution of $CaCl_2$) at 0 minutes and 1300 minutes. As shown in FIG. 4, no precipitation was observed in Fluid D up to at least 1300 minutes after the addition of $CaCl_2$) while precipitation was clearly observed in Reference Fluid C at 1300 minutes.

The mixing of Fluid D and Reference Fluid D and the subsequent tests of Fluid D and Reference Fluid D were performed at room temperature (e.g., 70° F.).

The treatment compositions described herein can be used, in some cases, to perform an acid treatment of a sandstone formation using only one stage of treatment. Because the use of fluoride scale inhibitor reduces the formation of fluoride scales in the formation during the acid treatment, the single stage treatment can be effective in removing calcium, aluminum, and silicon debris from the formation without creating diversions that can reduce the effectiveness of the acid treatment. Single-stage acid treatment of sandstone formations reduces the time to perform the treatment and reduces the volume of treatment fluid used for the treatment. Reduced volume of treatment fluid also reduces the volume of any flowback fluid handling.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. An aqueous composition, ~~comprising~~ consisting of:
   water;
   an acid controlling a pH of the aqueous composition, wherein the acid ~~does not include a boric acid~~ is hydrochloric acid (HCl);
   a hydrogen fluoride (HF) source comprising ammonium bifluoride, wherein a concentration of the HCl in the aqueous composition is greater than a concentration of the HF source in the aqueous composition; and
   a fluoride scale inhibitor, wherein a concentration of the fluoride scale inhibitor in the aqueous composition is greater than or equal to 0.1 wt % and less than 1.0 wt %.

2. The aqueous composition of claim 1, wherein the acid has a molecular weight greater than 0 Daltons and less than 400 Daltons.

3. The aqueous composition of claim 1, wherein the aqueous composition has a pH from about −0.8 to about 7.

4. The aqueous composition of claim 1, wherein the aqueous composition has a pH from about −0.8 to about 1.0.

5. The aqueous composition of claim 1, wherein the aqueous composition has a pH from about 1.0 to about 3.0.

6. The aqueous composition of claim 1, wherein the aqueous composition has a pH from about 3.0 to about 7.0.

7. The aqueous composition of claim 1, wherein the fluoride scale inhibitor comprises a phosphonic acid.

8. The aqueous composition of claim 1, wherein the fluoride scale inhibitor comprises hydroxyethylidene diphosphonic acid (HEDP) or a salt thereof, amino trimethylene phosphonic acid (ATMP) or a salt thereof, diethylene triamine penta (methylene phosphonic acid) (DTPMPA) or a salt thereof, 2-hydroxy phosphonoacetic acid (HPAA) or a salt thereof, polyamino polyether methylene phosphonic acid (PAPEMP), bis(hexamethylene triamine penta (methylene phosphonic acid)) (BHMTPMP) or a salt thereof, hydroxyethylamino-di(methylene phosphonic acid) (HEMPA) or a salt thereof, ethylene diamine tetra (methylene phosphonic acid) (EDTMPA) or a salt thereof, or hexamethylenediaminetetra (methylene phosphonic acid) (HMDTMPA) or a salt thereof.

9. An aqueous composition consisting of:
   water;
   an acid controlling a pH of the aqueous composition, wherein the acid is hydrochloric acid (HCl);
   a hydrogen fluoride (HF) source comprising ammonium bifluoride, wherein a concentration of the HCl in the aqueous composition is greater than a concentration of the HF source in the aqueous composition;
   a fluoride scale inhibitor, wherein a concentration of the fluoride scale inhibitor in the aqueous composition is greater than or equal to 0.1 wt % and less than 1.0 wt %; and
   at least one of a permanent clay stabilizer or a self-diverting additive.

10. The aqueous composition of claim 9, wherein the permanent clay stabilizer is present in the aqueous composition, and wherein the permanent clay stabilizer is a blend of sodium formate and cationic polymer.

11. The aqueous composition of claim 9, wherein the self-diverting additive is present in the aqueous composition, and wherein the self-diverting additive is a viscoelastic surfactant-based diverter.

12. The aqueous composition of claim 1, wherein:
   a concentration of the HCl in the aqueous composition is 9 wt %;
   a concentration of the ammonium bifluoride in the aqueous composition is 1.5 wt %; and
   a concentration of the fluoride scale inhibitor in the aqueous composition is 0.5 wt %.

13. A method, comprising:
   providing the aqueous composition of claim 1; and
   performing a treatment operation using the aqueous composition.

14. The method of claim 13, wherein the treatment operation comprises treating a siliceous geologic formation, a wellbore cleaning operation, a pickling operation, a spearhead treatment operation, a tube cleaning operation, or a gravel pack cleaning operation, or a combination thereof.

15. The method of claim 13, wherein performing the treatment operation is the only stage of an acid treatment operation performed on a geologic formation.

16. The method of claim 13, further comprising adjusting a pH of the aqueous composition using a mineral acid.

* * * * *